G. HOLDEN.
UTENSIL STERILIZER.
APPLICATION FILED MAR. 10, 1909.
929,307.
Patented July 27, 1909.
3 SHEETS—SHEET 3.
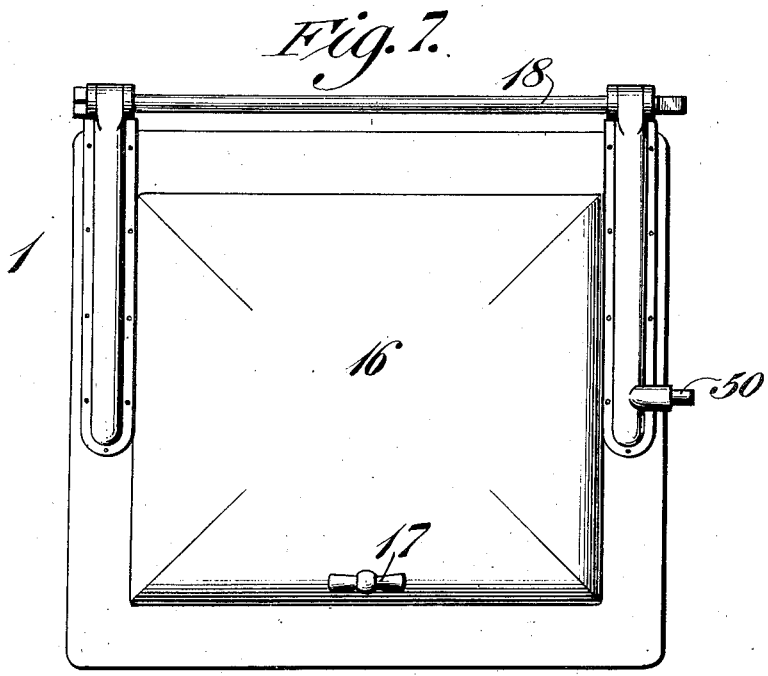
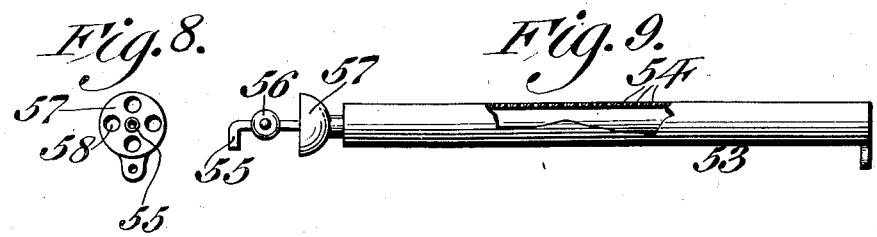

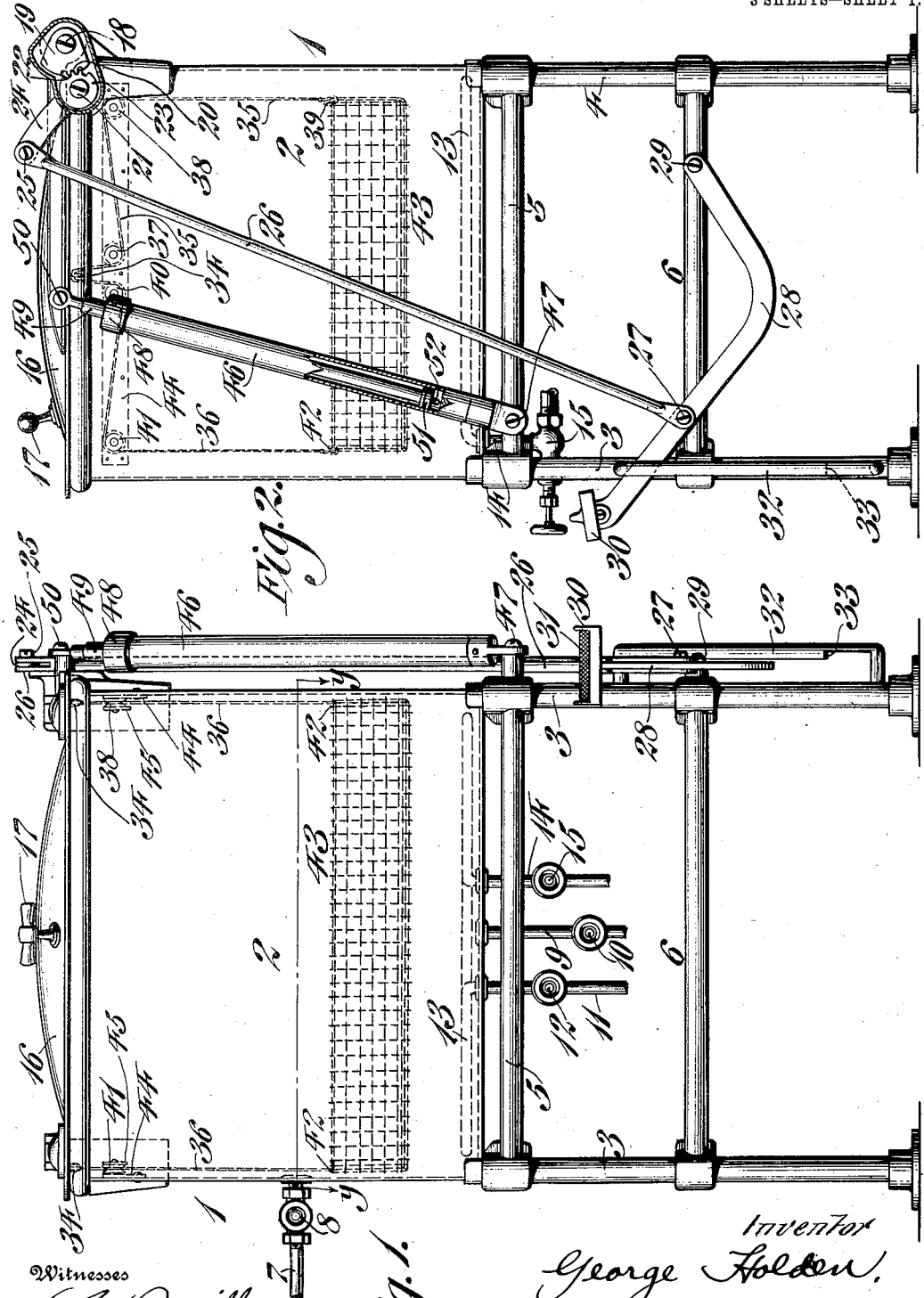

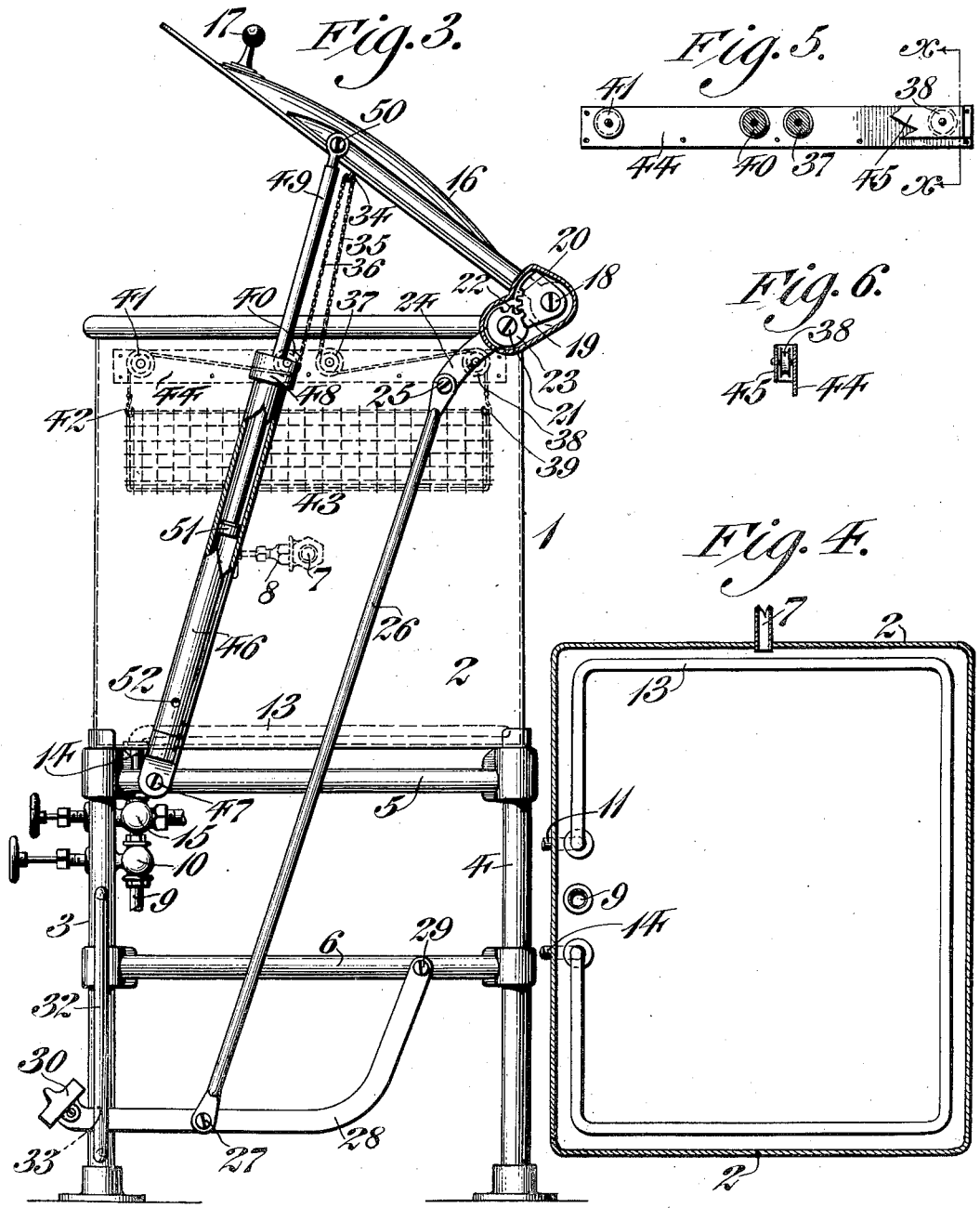

UNITED STATES PATENT OFFICE.

GEORGE HOLDEN, OF MERCHANTVILLE, NEW JERSEY, ASSIGNOR TO BERNSTEIN MFG. CO., A CORPORATION OF PENNSYLVANIA.

UTENSIL-STERILIZER.

No. 929,307.  Specification of Letters Patent.  Patented July 27, 1909.

Application filed March 10, 1909. Serial No. 482,416.

*To all whom it may concern:*

Be it known that I, GEORGE HOLDEN, a citizen of the United States, residing in Merchantville, county of Camden, State of New Jersey, have invented a new and useful Utensil-Sterilizer, of which the following is a specification.

My invention consists of a novel construction of utensil sterilizer, wherein provision is made for supplying a suitable tank with water or other liquid and then withdrawing the same, means being also provided for heating said water or liquid to the desired extent and provision being also made for enabling the articles to be sterilized to be raised into an accessible position by the raising of a cover actuated by foot power, whereby the hands of the operator are free to manipulate the articles to be sterilized.

My invention also consists of novel means for simultaneously raising the cage or basket adapted to receive the articles to be sterilized at the same time that the lid is raised, both said cage and lid being operated by a foot treadle and connections therefrom to said lid.

My invention further consists of a novel construction of dash pot connected to said lid, whereby the descent of the lid is automatically retarded without requiring attention on the part of the operator.

To the above ends my invention consists of a novel construction of utensil sterilizer, wherein novel means are provided for heating the sterilizing tank, for raising and lowering the receptacle for the articles to be sterilized simultaneously with the lid and for further permitting the descent of the lid to be automatically retarded, all of which is effected by a foot operated treadle, thus leaving the hands of the operator free to manipulate the articles to be sterilized.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of a utensil sterilizer embodying my invention. Fig. 2 represents a side elevation of the same. Fig. 3 represents a side elevation similar to Fig. 2 but showing the treadle depressed and the lid and its adjuncts in elevated position. Fig. 4 represents a section on line $y$—$y$, Fig. 1, with the sterilizing receptacle removed. Fig. 5 represents a side elevation, partly in section, of the pulleys and their adjuncts over which passes the chain supporting the utensil receptacle. Fig. 6 represents a section on line $x$—$x$, Fig. 5. Fig. 7 represents a plan view of the sterilizer. Fig. 8 represents an end view of a hydro-carbon burner and its adjuncts. Fig. 9 represents a side elevation, partly in section, of said hydrocarbon burner. Fig. 10 represents a plan view of Fig. 9.

Similar numerals of reference indicate corresponding parts in the figures.

Referring to the drawings:—1 designates my novel construction of sterilizer, the same consisting of a suitable tank 2 which may be of rectangular or other shape and constructed of metal or other material and is supported upon the framework consisting of the front legs 3 and the rear legs 4, which are braced in a suitable or convenient manner as by the upper and lower pipes or sections 5 and 6.

7 designates a water inlet pipe leading to the interior of the sterilizer, and having therein the valve 8, said water being withdrawn from the sterilizer through the drain pipe 9, which is controlled by the valve 10.

11 designates an inlet pipe for the steam or other heating medium, said pipe being controlled by the valve 12, said steam inlet pipe 11 discharging into the pipe 13, which may be arranged in the form of a coil or coils or a loop or loops, as shown in Fig. 4 at the bottom of the tank 2, said steam pipe 13 discharging from the bottom of the sterilizer through the pipe 14 to any suitable point, said pipe 14 being controlled by the valve 15.

16 designates the lid or cover of the sterilizer, the same being provided with the handle 17 and said lid being secured to the shaft 18, which is mounted in suitable bearings and has fast on one end thereof a segment 19 provided with the gear teeth 20 which are adapted to mesh with the teeth 22 on the segment 23, which is mounted on the bearing 21, said segment 23 being provided with a rock arm 24, which is pivotally secured at the point 25 to the upper end of the link or rod 26, the lower end of the latter being pivotally secured at 27 to the lever or treadle 28, which is fulcrumed at the point 29 and is provided at its outer extremity with the foot piece 30 which, if desired, may be provided with the tread 31 of rubber or other similar material, as will be understood from Fig. 1.

32 designates a guard or guide for the lever or treadle 28, the said guard being provided with a recess 33 into which the lever or treadle 28 is adapted to spring when it assumes its depressed position seen in Fig. 3.

34 designates a hook or lug at each side of the lid or cover 16 to which is attached the chains 35 and 36, it being noted that the chain 35 passes around the pulley 37 which is mounted in suitable bearings and thence over the pulley 38 also mounted in suitable bearings, the extremity of said chain 35 being hooked or otherwise secured at the point 39 to the cage or basket 43, which may be of wire or other similar material. In a similar manner the chain 36 passes around the pulley 40 and thence over the pulley 41 and has its extremity 42 hooked or otherwise secured to the cage or basket 43, it being noted, as will be understood from Fig. 1, that there are two sets of chains and pulleys arranged one at each side of the sterilizer tank so that the cage or basket 43 is properly supported in its substantially horizontal position when at rest in its lower position, as seen in Figs. 1 and 2 or when raised to its elevated position seen in Fig. 3. The pulleys 41, 40, 37 and 38 may be mounted in bearings secured to the upper interior opposite sides of the tank 2 in any convenient manner and in the present instance I have shown a preferred form of assembling and mounting said pulleys, consisting of a bar 44 which is adapted to be riveted or otherwise secured to the opposite inner walls of the tank 2, said bar being provided with the strip or plate 45 secured thereto, as will be understood from Figs. 5 and 6, wherefrom it will be apparent that the pulleys can be readily assembled upon their bearings and the bar or plate 44 carrying the same can then be readily riveted or secured to the opposite upper inner walls of the tank, as indicated in Fig. 1, in the desired position.—

46 designates a dash pot or cylinder which has its lower extremity pivotally supported at the point 47, the upper extremity of said dash pot being closed by a suitable cap, closure or stuffing box 48, through which passes the rod 49 which has its upper end connected at the point 50 to the lid 16, the lower end of said rod 49 being provided with the piston or plunger 51, as will be understood from Figs. 2 and 3, it being apparent that as the plunger or piston 51 descends, a slight egress of the air below it is permitted through the port 52, whereby the descent of the piston, rod, lid and their adjuncts will be retarded the desired extent.

It will be apparent that while I have shown my invention as especially adapted to have the contents of the tank heated by steam or other fluid which enters through the pipe 11 and which is discharged into the pipe 14, I may provide means for heating the sterilizing tank exteriorly through the medium of a hydro-carbon burner, such for example as is shown in Figs. 8, 9 and 10, wherein 53 designates the burner tube, which is provided with the perforations 54 into which the hydro-carbon is conducted through the inlet pipe 55, which is provided with a valve 56, the device 57 being provided with ports 58 whereby a sufficient quantity of atmospheric air is permitted to enter for the purpose of assisting the combustion of the hydro-carbon. The detailed construction of such burners will be familiar to those skilled in the art and I have deemed it unnecessary to describe the same in further detail.

The operation is as follows:—The parts normally appear as seen in Figs. 1 and 2, wherein the lid or cover 16 is shown as being closed, the cage or basket 43 is in its lower position and the treadle 28 and its adjuncts is shown in its elevated or inoperative position. When it is desired to sterilize the utensil or other articles, the tank 2 is first filled or partially so with water which is permitted to enter through the pipe 7, the valve 8 being opened and the valve 10 being closed. After the tank is filled with water to the desired extent, steam or other heating fluid is admitted through the pipe 11, the valves 12 and 15 being properly manipulated for this purpose. To raise the lid and to bring the cage or basket 43 into the uppermost positions, seen in Fig. 3, it is only necessary for the operator to depress the lever or treadle 28 from the position seen in Figs. 1 and 2 into the position seen in Fig. 3, whereupon the treadle will spring into the recess 33 and be held in its lowermost position for the desired period. The depression of the treadle 28 exerts a pull upon the link 26, whereupon the rock arm 24 is moved from the position seen in Fig. 2 into the position seen in Fig. 3 and by reason of the engagement of the teeth 22 with the teeth 20 the segment 19 and the lid 16 are raised from the position seen in Fig. 2 into the position seen in Fig. 3. The raising of the lid 16 simultaneously exerts a pull upon the chain or chains 35 and 36, whereupon the cage or basket 43 is raised from the position seen in Figs. 1 and 2 to the position seen in Fig. 3, whereupon the cage or basket 43 can be filled with the utensils to be treated or any utensils which have been treated can be removed therefrom by the operator, since his hands are free for this purpose.

In order to close the sterilizer it is only necessary to disengage the treadle or lever 28 from the stop or shoulder 33, whereupon the parts assume the position seen in Figs. 1 and 2 and the sterilizing operation can be continued to the desired extent. Through the medium of the dash pot cylinder 46 the piston 51, the rod 49 and their adjuncts, it will be evident that the descent of the rod 49, the lid 16 and the cage 43 will be retarded to the desired extent so that the lid 16 descends and closes without shock or jar or injury to the contents of the receptacle 43.

It will be evident from the foregoing that by my novel construction I have devised a sterilizer whose cover can be opened by foot power and automatically closed without requiring manual attention from the operator and the sterilizing receptacle is also automatically raised simultaneously with the elevation of the cover.

It will be apparent that the opening and closing of the sterilizer is effected without requiring manipulation on the part of the operator, thus leaving his hands free to remove and manipulate the utensils to be sterilized.

It will be apparent that slight changes may be made by those skilled in the art in the manner of supporting the sterilizing cage or basket 43 and in the manner of heating the tank and effecting the raising and lowering of the sterilizing lid and the operation of the dash pot, which will come within the scope of my invention and I therefore reserve to myself the right to make all such changes that come within the spirit of the same and do not desire to be limited in every instance to the exact construction I have herein shown and described.

What I claim is:—

1. In a utensil sterilizer, a supporting frame, a tank, a pivotally mounted lid therefor, a utensil receptacle flexibly supported from the lid, a pivotally mounted treadle, a rod pivotally connected with said treadle, a rock arm pivotally connected to said rod, a toothed segment movable with said rock arm, a shaft mounted in bearings on said tank, a toothed segment fast thereon and meshing with the segment of the rock arm, and means engageable by a lateral movement of the treadle for holding the lid in its open position.

2. In a utensil sterilizer, a tank, a lid therefor, a pivot for the lid, a segment fast on one end of said pivot, a rock arm, a segment carried thereby and engaging the first-named segment, a treadle connected with said rock arm, a utensil receptacle, flexible connection between the same and the lid whereby depression of the treadle actuates said lid and utensil receptacle, and guide pulleys for said flexible connection upon the inner wall of the tank, said pulleys being mounted upon the opposite sides of the inner wall of the tank parallel thereto, a supporting framework, a cylinder pivotally connected at its lower end with the framework, and a rod pivotally connected at its upper end with the lid at a distance from its pivot and a plunger carried by said rod and adapted to reciprocate within said cylinder.

3. In a utensil sterilizer, the combination of a tank, a pivoted lid therefor, a utensil receptacle connected with the lid and movable simultaneously therewith, a pivoted foot treadle and geared connections with the pivot of said lid for actuating the same, a vertical guard for said foot treadle, said guard having a recess near its lower end into which said treadle is adapted to spring when it reaches its depressed position, and a dashpot relatively connected with said lid for retarding its downward movement and embodying a cylinder pivotally mounted at its lower end and a rod pivotally connected at its upper end with the lid and provided with a plunger adapted to reciprocate within said cylinder.

GEORGE HOLDEN.

Witnesses:
WM. P. BERNSTEIN,
CHAS. E. SHAPEL.